3,639,535
TETRAPHOSPHONATES OF DIALLYL CHLORENDATE

Erich Kuehn, Wilmington, Del., assignor to Atlas Chemical Industries, Inc., Wilmington, Del.
No Drawing. Filed May 3, 1968, Ser. No. 726,538
Int. Cl. C07f 9/40; C08g 22/44
U.S. Cl. 260—932                                    3 Claims

ABSTRACT OF THE DISCLOSURE

Phosphorus-containing compounds of diallyl chlorendate. The compounds have the properties of imparting flame-retardancy and intumescence to polymeric materials.

---

This invention relates to compositions having flame-retardant characteristics, to compositions having intumescent characteristics, to components which impart such characteristics to such compositions and to methods of preparation of such components and compositions.

The need for flame-retardant construction and decorating materials in the building arts and trades has gained substantial importance in recent years and, accordingly, the search for components suitable for imparting flame-retardant characteristics to such materials as paints, coatings, films, foams and the like, has been unremitting and wide-spread. With respect to films and coatings, a very desirable characteristic, in addition to simple flame-retardancy, that is, in addition to the self-extinguishing and non-burning properties of the material, is that of intumescence whereby the coating or film swells or bubbles up when subjected to heat or flame to provide a coherent shield spaced apart from the substrate which protects the same from attack by fire. Optimally, therefore, components introduced into films and coatings for the purpose of rendering them fire-resistant will include not only components which impart flame-retardancy thereto, as that term is ordinarily understood, but also components which impart the characteristic of intumescence as well.

It is accordingly, an object of this invention to provide novel compositions which impart the characteristics of flame-retardancy to polymeric materials when incorporated thereinto.

It is another object of this invention to provide compositions which impart characteristics of flame-retardancy and intumescence to polymeric materials, especially films and coatings, when incorporated thereinto.

It is another object of this invention to provide polymeric compositions having the characteristic of flame-retardancy.

It is another object of this invention to provide polymeric compositions having the characteristic of intumescence.

It is another object of this invention to provide method for preparing polymeric materials having characteristics of flame-retardancy and both flame-retardancy and intumescence.

In accordance with this invention, the foregoing objects and still further objects are broadly achieved by providing classes of compounds suitable for incorporation into polymeric materials to impart flame-retardancy and, in some cases, intumescence thereto. A novel flame-retardant composition as provided in accordance with this invention is characterized by the following generalized formula:

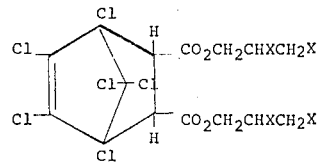

wherein X is selected from the group consisting of halogen atoms having an atomic weight greater than 20 and the group —PO(OR)$_2$ in which R is selected from the group consisting of alkyl radicals containing from 1 to 4 carbon atoms, alkenyl radicals containing from 2 to 4 carbon atoms, alkenyl radicals containing from 2 to 4 carbon atoms substituted with at least 2 halogen atoms having an atomic weight greater than 30, a phenyl group and a phenyl group substituted with a halogen atom having an atomic weight greater than 30.

Products defined by the formula given above may be prepared by the halogenation in the presence of butyl alcohol and at temperatures below 70° C., preferably between about 0° C. and 30° C. of di-allyl chlorendate, an ester which it' itself an easily available commercial product and which may also be easily prepared by reacting one mole of chlorendic anhydride with two moles of allyl alcohol. Chlorendic acid or its anhydride may be prepared by conventional chemical processes by reacting hexachlorocyclopentadiene with maleic acid or maleic anhydride respectively. A preferred halogen for use in the preparation of compounds useful to impart fire-retardancy to films, coatings, foams and similar polymeric materials in accordance with this invention is bromine. The following chemical equation illustrates the preparation of a typical bromine-containing component suitable for use in the preparation of fire-retardant polymeric materials in accordance with the present invention:

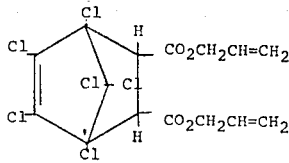 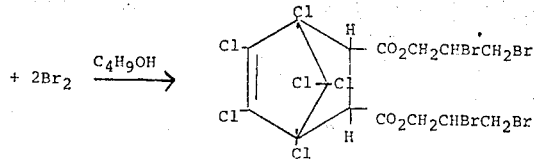

The phosphorus-containing compounds defined by the generalized formula set forth above may be produced by reacting at an initial temperature of from about 50° C. to 60° C. the halogenated product with an alkali metal salt of a phosphorus acid ester such as dialkyl phosphite, trialkyl phosphite or a diaryl phosphite while refluxing in suitable solvent within a temperature range of about 70° C. to about 200° C. Alkyl groups forming the phosphoric acid ester may be methyl, ethyl, propyl or butyl radicals. The aryl group may be the phenyl radical or a halophenyl radical. The following generalized chemical equation is illustrative of the preparation of phosphorous-containing compositions conforming to the formula set forth above:

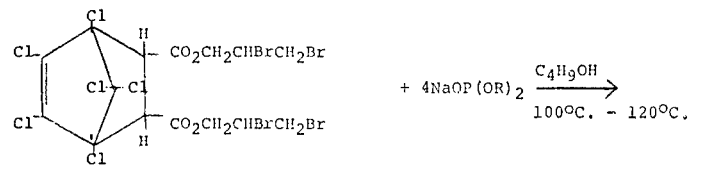

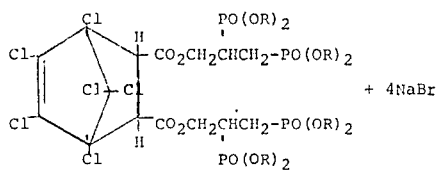

wherein R is selected from the group consisting of an alkyl group containing from 1 to 4 carbon atoms, a phenyl group and a halogen substituted phenyl group.

Suitable compounds which may be used for reaction with the halogenated diallyl chlorendate to produce the phosphorus-containing derivative include sodium dibutyl phosphite, sodium dimethyl phosphite, potassium dphenyl phosphite, sodium di(chlorophenyl) phosphite, trimethyl phosphite, sodium diethyl phosphite, tripropyl phosphite and others.

The following are representative compounds useful in the preparation of flame-retardant polymeric materials in accordance with this invention:

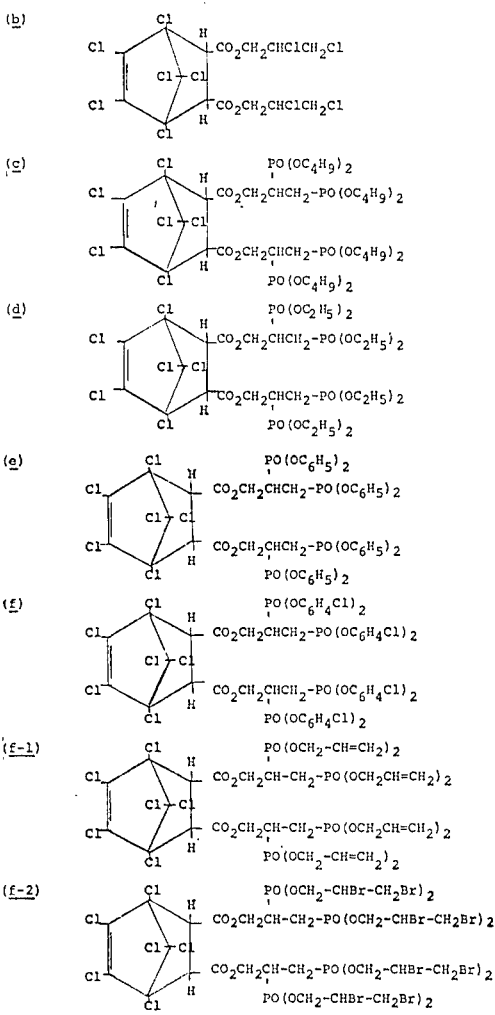

The following is a specific example of the preparation of a halogenated diallyl chlorendate suitable for use in accordance with the present invention:

EXAMPLE 1

The reaction is carried out in a suitable 3-necked flask equipped with stirrer, reflux condenser and dropping funnel. 467 grams (1 mole) of diallyl-chlorendate are dissolved in 200 ml. of butanol. The reaction flask is then placed into an ice-water bath and from a dropping funnel 320 grams (2 moles) of bromine are added dropwise to saturate completely the diallyl chlorenate. The bromine may be added until the solution is no longer decolorized by addition of more bromine—at this point 2 moles of bromine per mole of dialyl chlorendate have been added and the resulting reaction product is abrominated diallyl chlorendate having a chemical structure which accords with Formula (A) above.

The following is aspecific example of the preparation of a phosphorus-containing product suitable for use to impart flame-retardant characteristics to polymeric materials in accordance with the present invention:

EXAMPLE 2

In a suitable vessel, 92 grams (4 moles) of sodium are dissolved in 200 grams of butanol and 776 grams (4 moles) of dibutyl phosphite. When all sodium is dissolved or has been converted to sodium dibutyl phosphite, the resultnig solution is then added to the product obtained in Example 1 at about 50° C.–60° C. The addition of sodium dibutyl phosphite to the brominated dialyl chlorendate results in a reaction which is exothermic in character. When all sodium dibutyl phosphite has been added, the mixture is refluxed at a temperature between 100° C.–120° C. for three hours to ensure complete condensation. The condensation is complete when no more sodium bromide is formed. After cooling, the solution is washed salt free and the butanol is removed under vacuum. The resulting product has low viscosity, is clear and slightly brownish. The product conforms in its chemical structure to Formula (c) above. The yield is about 98%.

Another class of flame-retarding compositions useful in the practice of the present invention is exemplified by mineral acid salts of compounds broadly characterized by the following generalized formula:

(2)
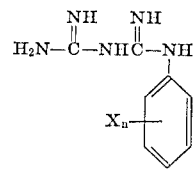

wherein X is a halogen having an atomic weight greater than 30 and $n$ is a number from 0 to 5.

Compounds comprised by the preceding formula may be prepared, in general, by reacting a suitable acid salt of aniline and dicyandiamide in molar proportions in an acid medium. As a practical matter, any mineral acid may be used; however, hydrochloric cid is preferred. The following chemical equation illustrates the preparation of a typical flame-retardant composition of the kind characterized by the Formula 2 above:

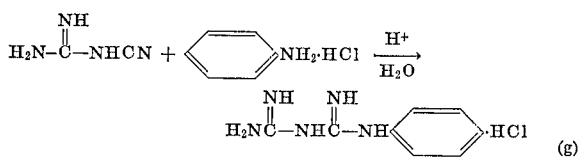

The following are representative compounds useful in the preparation of flame-retardant materials in accordance with this invention:

(g)
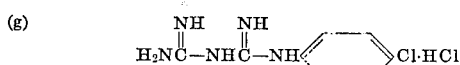

(i)
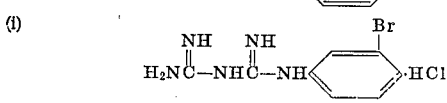

(j)
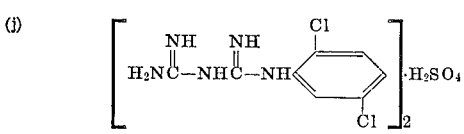

(k)
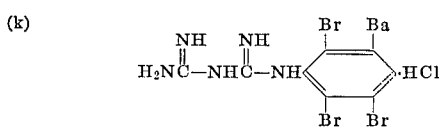

The following specific example illustrative the preparation of a typical composition suitable for use to impart flame-retardancy to plastic and polymeric materials conforming to Formula 2 above:

EXAMPLE 3

The reaction is carried out in a 1000 ml., 3-necked flask equipped with reflux condenser and stirrer. 129.6 grams of an iline hydrochloride (1 mole) is dissolved in 300 ml. of water. Thereafter, 84 grams (1 mole) of dicyandiamide (cyano-guanidine) are added to the solution. After addition of a small amount of CHI, the mixture is heated to reflux temperature. During the heating, the dicyandiamide also goes into solution. After about 30 minutes of refluxing, a greenish-gray solid precipitates. The precipitate, which is phenylbiguaniidnehydrochloride, is filtered off and washed with water. After drying, the phenylbiguanidinehydrochloride may be ground into a fine powder to be used as a flame-retardant pigment component. The product conforms in its chemical structure to Formula (g) above.

In accordance with the present invention, fire-retardant coatings, films, foams and such polymeric materials may be prepared by incorporation thereinto from about 5% to about 60% by weight of the total polymeric composition of the chlorendic acid ester derivative hereinbefore described and characterized by Formula 1 above or from aobut 25% to about 60% by weight of the total polymeric composition of the phenylbiguanidine derivative hereinbefore described and characterized by Formula 2 above.

In general, the flame-retarding components described herein are compatible with a wide variety of polymeric materials and resins from which films or coatings and, in some cases, even foams may be made. Among those resinous or polymeric materials with which said flame-retardant components are compatible are, for example, polyester resins, polyurethane resins, cellulose derivatives, polymeric vinyl resins, epoxy resins and others.

Polyester resins which are useful in accordance with this invention include linear polyesters made by reacting glycols or other diols with dibasic organic acids and abundantly described in the art. Such linear polyesters comprise the reaction products of dihydric alcohols such as ethylene glycol, diethylene glycol, propylene glycol, bisphenol A, prodendro bisphenol A, higher molecular weight polyglycols and numerous other diols and aliphatic dibasic carboxylic acids such as adipic acid, phthalic acid, sebacic acid, fumaric acid and maleic acid and others in proportion to completely esterify the hydroxyl group present in the dihydric alcohol. Cross-linked polyesters made by reacting polyfunctional alcohols, such as glycerol, with the aforementioned aliphatic carboxylic acids in sufficient proportion to esterify the hydroxyl groups present in the polyhydric alcohol. Unsaturated polyesters cross-linked with a vinyl-type monomer, such as styrene, may be used. Polyesters which may be used in the practice of the present invention comprise, but are not restricted to, those described and their method of preparation disclosed in U.S. Pats. 2,453,644; 2,593,787; 2,409,633; 2,443,735; 2,443,741; 2,450,552; 2,255,313; 2,512,410; 2,634,251; 2,662,069 and 2,662,070, all hereby incorporated by reference.

Epoxy resins, characterized by the presence of the group,

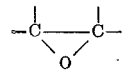

are useful in the practice of the present invention and comprise polymeric reaction products of polyfunctional halohydrins, such as epihalohydrins with polyfunctional hydrogen-donating reactants, or their salts, such as polyfunctional phenols, alcohols, amines, acids and their salts. Typical of these is the reaction product of an epihalohydrin, such as epichlorohydrin and bisphenol A. The preparation of such an epoxy resin is described in U.S. Pat. 2,500,449 in which epichlorohydrin is reacted with bisphenol at 100° C. in the presence of sufficient alkali to bind the hydrochloric acid formed. The resins formed vary according to the proportions of reactants and reaction conditions. Epoxy resins of the kind useful in the practice of this invention are further described in U.S. Pats. 2,324,483; 2,444,333; 2,503,726; 2,558,949; 2,500,600; 2,467,171; 2,528,932; 2,582,985 and 2,615,007, all incorporated by reference.

The fire-retardant components of the present invention may be used in coatings prepared from synthetic polymer emulsions. Monomers from which such synthetic high polymers may be prepared are in general characterized by the formula

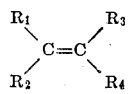

wherein $R_1$, $R_2$, $R_3$ and $R_4$ may be hydrogen or almost any kind of ligand. In most cases at least two hydrogen atoms are linked directly to the ethylenic carbon atoms and in the true vinyl monomers $R_1$, $R_2$ and $R_3$ are all hydrogen. Examples of monomers which may be used in surface coating emulsions are vinyl acetate; vinyl chloride; acrylonitrile; vinylidene chloride; styrene; butadiene 1,3; alkyl acrylates, such as ethyl acrylate; alkyl methacrylates, such as methyl methacrylate; alkyl maleates, such as isopropyl maleate; alkyl fumarates, such as isobutyl fumarate; acrylic acid; methacrylic acid; crotonic acid and others. The technique of emulsion polymerization of vinyl esters is well known in the art and is exemplified in U.S. Pat. 2,562,965, hereby incorporated by reference.

The flame-retardant components of the present invention may be used in coatings made of cellulose derivatives and include coatings made from cellulose esters, such as cellulose nitrate, cellulose phosphate, cellulose acetate, cellulose acetate butyrate and others. Coatings formed from cellulose ethers may be used. These comprise, for example, methyl cellulose, ethyl cellulose, methyl ethyl cellulose, hydroxyethyl cellulose, methyl hydroxyethyl cellulose, ethyl hydroxyethyl and benzyl cellulose.

In accordance with the present invention, the above-described flame-retardant additives may be used in the preparation of a wide variety of polyurethane films, coatings and foams. Coatings and foams comprising multiple urethane linkages formed by the reaction of an isocyanate and a compound containing a hydrogen atom or atoms reactive therewith as, for example, hydroxyl-bearing compounds such as polyesters and polyethers having terminal hydroxyl groups.

Suitable polyesters useful in the preparation of polyurethane coatings and foams in accordance with this invention may be obtained by esterification condensation reaction of an aliphatic dibasic carboxylic acid with a glycol or triol or mixture thereof in such proportion that the resultant polyesters possess predominantly terminal hydroxyl groups. Aliphatic dibasic carboxylic acids which may be used to prepare such polyesters comprise adipic acid, fumaric acid, sebacic acid and phthalic acid, for example, and suitable alcohols include ethylene glycol, diethylene glycol, trimethylol propane and others.

Fatty acid glycerides may be used as the hydroxyl-bearing component in the preparation of the polyurethane polymers of the present invention and comprise those having a hydroxyl number of at least 50, such as castor oils, hydrogenated castor oils of blown neutral oils.

Polyesters, generally, which may be used in the preparation of polyurethane polymers are described in U.S. Pats. 2,453,644; 2,593,787; 2,409,633; 2,443,735–41; 2,450,552; 2,255,313 and 2,512,410, all hereby incorporated by reference.

Polyether hydroxyl-bearing compounds which may be used to prepare both polyurethane coatings and foams in accordance with this invention comprise those having a functionality of two or more, i.e., polyethers which are diols, triols, tetrols, pentols or hexitols. Particularly suitable polyethers are polyoxyalkylene ethers of polyhydric alcohols or amines such as polyoxyalkylene glycols, polyoxyalkylene biphenol A, polyoxyalkylene sorbitol, polyoxyalkylene methyl glucoside, polyoxyalkylene pentaeryithritol, polyoxyalkylene sucrose, polyoxyalkylene trimethylolethane, polyoxyalkylene trimethylol propane, polyoxyalkylene diethylene triamine and polyoxyalkylene glycerine. The polyoxyalkylene ether of the polyhydric alcohol may be prepared, if desired, by reacting an alkylene oxide compound with a selected polyhydric alcohol in the conventional manner. The overall range of alkylene oxide groups per molecule may vary within a range of about 2 to about 80 and the alkylene oxides which may be used comprise ethylene oxide, propylene oxide, butylene oxide and others.

More specifically, among the hydroxy-bearing compounds which may be used to prepare polyurethane polymers useful in the practice of the present invention are polyoxyalkylene bisphenol A containing from 2 to 20 oxyalkylene groups per molecule and including the polyoxyethylene, polyoxypropylene and polyoxybutylene derivatives; 1,2,6-hexanetriol; dipropylene glycol; propylene glycol; ethylene glycol; polyoxyethylene(2)cyclohexane dimethanol; polypropylene glycol (M.W. 1000); glycerine, trimethylol propane; polyoxypropylene(40)-sorbitol; polyoxypropylene(20)methyl glucoside; polyoxypropylene(10)isosorbide as well as many other polyhydric alcohols indicated, for example, in U.S. Pat. 2,843,568, hereby incorporated by reference. Accordingly, aromatic, aliphatic and cycloaliphatic hydroxy compounds may be utilized in the preparation of polyurethane polymers. Ethylene oxide, propylene oxide and oxide derivatives of such polyhydric alcohols may be used, as well as hydroxyl-terminated polyesters derived from saturated or unsaturated dibasic acids, simple glycols and modifying trihydric alcohols. In many cases it will be desirable to use two or more polyhydric alcohols in combination to produce a polyurethane polymer having the desired characteristics.

A wide variety of organic isocyanate compounds may be used to prepare the polyurethane polymers useful in the practice of the present invention, among which are included toluene diisocyanate, diphenyl diisocyanate, triphenyl diisocyanate, chloro-phenyl - 2,4 - diisocyanate, ethylene diisocyanate, 1,4-tetramethylene diisocyanate, p-phenylene diisocyanate, hexamethylene diisocyanate, 3,3'-dimethyl-4,4'-biphenylene diisocyanate, 3,3'-dimethoxy-4,4'-biphenylene diisocyanate, polymethylene polyphenyl polyisocyanate (PAPI), diphenylmethane-4,4'-diisocyanate and others.

Suitable catalysts for the preparation of polyurethane foams comprise amine catalysts and tin catalysts and mixtures thereof. Representative amine catalysts are N-alkyl morpholines, such as N-methyl morpholine and N-morpholine; tertiary amines, such as trimethyl amine, triethyl amine, tetramethylguanidine, triethylene diamine, N,N,N',N'-tetramethyl-1,3-butane diamine; piperazine and piperazine derivatives, such as N-methyl piperazine. These amines may be present in amounts from about 0.05% to about 2% by weight of the hydroxy-bearing compounds reacted with the isocyanate compound. Among the suitable tin catalysts are included dialkyl tin laurates, such as dibutyl tin laurate, dibutyl tin di-2-ethyl hexoate, dibutyl tin diacetate, stannous oleate and stannous octoate. Tin catalysts may be present in amounts from about 0.1% to about 1.0% by weight of the hydroxy-bearing compound used in the reaction.

Examples of useful surface active agents which may be used in the preparation of polyurethane foams comprise water-soluble siloxane-oxyalkylene block copolymers as described in U.S. Pat. 2,834,748, to Bailey et al., condensates of ethylene oxide with a hydrophobic base formed by condensing propylene oxide with propylene glycol having generally the formula $$HO(C_2H_4O)_a(C_3H_6O)_b(C_2H_4O)_cH$$

Another class of surfactants is comprised by the formula

$[(OC_3H_6)_x(OC_2H_4)_yOH]_2$

Other surfactants comprise the polyoxyalkylene esters of long chain fatty acids and sorbitan, such as polyoxyethylene(20)sorbitan monolaurate, polyoxyethylene(4)sorbitan monolaurate, polyoxyethylene(20)sorbitan monopalmitate, polyoxyethylene(20)sorbitan monostearate, polyoxyethylene(20)sorbitan tristearate, polyoxyethylene(5)sorbitan monooleate and others.

A foaming agent, such as a halogenated saturated aliphatic hydrocarbon or a mixture of such hydrocarbons, may be used to prepare polyurethane foams suitable for use in the practice of this invention. These comprise, inter alia, trichlorofluoromethane (Freon 11), monochloroethane, monochloromonofluorethane, dichlormethane and their mixtures.

In general, plyurethane foams are prepared in accordance with this invention in suitable proportion to provide a ratio of hydroxyl groups to isocyanate groups within a range of about 1/1.05 to about 1/1.7, with a ratio of about 1/1.05 preferred.

The following are specific examples of the preparation of fire-retardant polymeric coatings according to the method of the present invention:

EXAMPLE 4

Moisture-curing flame-retardant polyurethane coating

A prepolymer is prepared which is the product of reaction of toluene diisocyanate and polyoxypropylene(10)-sorbitol in proportion to provide a ratio of isocyanate groups to hydroxyl groups in the end product of about 4.5 to 1. The reaction is carried out in a one liter, 3-necked round-bottom flask equipped with stirrer, nitrogen inlet, dropping funnel and reflux condenser. 392 grams of toluene diisocyanate are placed in the flask at room temperature under nitrogen and stirring. 114 grams of polyoxypropylene(10)sorbitol are then added over a 30 minute period of time. The reaction is exothermic and the temperature should be held at 70° C. (using a heating mantle) for five hours. After cooling the prepolymer is ready for use. The free isocyanate content is about 28% by weight. The final curing of the urethane coating is achieved by reaction of the free isocyanate groups of the prepolymer with atmospheric moisture.

A clear varnish is prepared by first dissolving 41.7 grams of the urethane prepolymer in 10.4 grams of Cellosolve acetate, 5.2 grams of methyl ethyl ketone and 5.2 grams of toluene with slow stirring. The sequence of solvent addition is unimportant. When the prepolymer solution has become clear, 37.5 grams of the phosphorus-containing allyl chlorendate derivative of Example 2 is stirred into the solution with slow mixing. The varnish is then ready for use.

EXAMPLE 5

Moisture-curing flame-retardant polyurethane coating

A urethane prepolymer is prepared as in Example 4. A varnish is then prepared by dissolving 17.3 grams of the urethane prepolymer in 17.5 grams of Cellosolve acetate, 8.75 grams of methyl ethyl ketone and 8.75 grams of toluene with slow stirring. When the prepolymer solution has become clear, 47.7 grams of the phenylbiguanidine hydrochloride of Example 3 are stirred into the solution with slow mixing. The resulting varnish may be used wherever a flame-retardant varnish is required.

The following is a specific example of the preparation of a flame-retardant polyurethane foam in accordance with the method of the present invention:

EXAMPLE 6

Rigid polyurethane foam formulation

Component A: Percent by weight
Polymethylene polyphenyl isocyanate (Mondur MR) _____ 40.0
Component B:
 Polyoxyethylene(10)sorbitol _____ 35.0
 Dimethylethanol amine _____ 1.0
 Dibutyl tin laurate _____ 0.1
 Siloxane-oxyalkylene block copolymer surfactant (L5310, Union Carbide) _____ 0.6
 Allyl chlorendate derivative of Example 2 _____ 10.0
 Trichlorofluoromethane _____ 13.0

Component B in the above formulation is prepared by adding together in a suitable vessel each of the named ingredients sequentially in the order and the amounts specified while mixing thoroughly with a high speed mixer. To the homogeneous mixture is then added quickly and in a single addition the entire specified amount of organic isocyanate (Component A). The combined components are then mixed at high speed with a laboratory mixer for about 10 seconds, after which the mixture is poured into a 1 gallon paper cup and allowed to foam. The foam may be determined to have the following properties as indicated:

Cream Time (sec.) _____ 17
Foam Time (sec.) _____ 55
Tack free Time (sec.) _____ 42

Burning Test (ASTM D1692-59T)

Seconds: Inches
 −26 _____ 1
 −33 _____ 1⅜
 −35 _____ 1
 −34 _____ 1
 −25 _____ 1

In accordance with an important modification of this invention flame-retardant and intumescent films and coatings may be produced by combining therein with a mineral acid salt of a phenylbiguanidine derivative, as defined by Formula 2 above, a suitable phosphorus-containing flame-retardant component such as those exemplified hereinafter. In accordance with this invention, intumescent polymeric materials may be made by incorporating thereinto from about 5% to about 60% by weight of a combination of flame-retardant additives including as necessary ingredients the phenylbiguanidine derivative characterized by Formula 2 above and a phosphorus-containing flame-retardant material. The proportions of said necessary flame-retardant ingredients in said polymeric materials may vary from a ratio of about 1 part by weight of said phenylbiguanidine derivative to 1 part by weight of said phosphorus-containing compound to 20 or more parts by weight of said phenylbiguanidine derivative to about 1 part by weight of said phosphorus-containing compound, provided, however, that if the phenylbiguanidine derivative should be used in amounts less than about 25% by weight of the composition, then the concentration of said phosphorus-containing compound must be not less than 4% by weight of said polymeric material.

A wide variety of phosphorus-containing compounds may be used in combination with the phenylbiguanidine derivative characterized by Formula 2 above to provide flame-retardant intumescent polymeric materials. Preferred phosphorus-containing flame-retardant additives for use in this connection are those subsumed under Formula 1 above. Many other phosphorus-containing materials may be used, however, including organic esters and partial esters and partial esters of phosphoric acid, phosphoric acid salts and organic phosphites and phosphonates. Representative of the many phosphorus-containing materials which may be used, for example, are tertiary phosphites, such as trimethyl, triethyl, tripropyl and tributyl phosphite, tri (2 ethylhexyl) phosphite, tridecyl phosphite (iso), trioctadecyl phosphite, triphenyl phosphite, diphenyl pentaerythritol phosphite and phenylenopentyl phosphite; secondary phosphites, such as dimethyl, diethyl, dipropyl and dibutyl phospihte, diallyl phosphite, di (2 ethylhexyl) phosphite, diphenyl phosphite, dioctadecyl phospihte and dilauryl phosphite; phosphonate and phosphorothionate esters, such as dimethyl methyl phosphonate, diallyl allyl phosphonate, dimethyl benzyl phosphonate, trimethyl phosphorothionate and ethylene phenyl phosphorothionate; organophosphorus compounds, such as bis(hydroxymethyl) phosphinic acid, methyl phosphonic acid, trimethallyl phospihte and triallyl phosphate; alkyl acid phosphates having the generalized formula

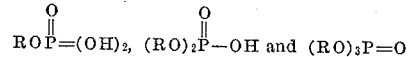

wherein R is a radical selected from the group consisting of methyl, ethyl, propyl, butyl, phenyl and cresyl, such as methyl acid phosphate, n-butyl acid phosphate, amyl acid phosphate and lauryl acid phosphate, as well as many other phosphorus containing flame-retardant additives such as those disclosed in U.S. Pats. 2,691,567; 2,683,168; 3,206,-474; 2,795,609; 3,014,944; 3,014,956; 3,042,701 and 3,058,941, all hereby incorporated by reference.

The following is an illustrative example of the preparation of a flame-retardant, intumescent coating in accordance with the method of the present invention:

EXAMPLE 7

Flame-retardant nitrocellulose lacquer formulation

Ingredient: Percent by weight
Nitrocellulose RS ½ sec. (30% butanol) ____ 10.2
Phosphorus-containing derivative of Example 2 _____ 14.3
Phenyl biguanidine hydrochloride of Example 3 _____ 28.6
Xylene _____ 10.2
Butyl acetate _____ 22.45
Cellosolve acetate _____ 14.25

The nitrocellulose, wetted with 30% butanol, is placed in a solution vessel and the diluent (xylene) is added in the quantity specified. Thereafter, the solvents butyl acetate and Cellosolve acetate are added. The mixture is stirred until the nitrocellulose solution is clear. Finally, flame retardant additive of Examples 2 and 3 are added in the quantities indicated.

It should be appreciated that the phenylbiguanidine derivative acts as a pigment and consequently requires grinding as may any other pigment. Standard equipment used in paint manufacture may be used for this purpose. It should be further appreciated that the flame-retardant additives may be incorporated into the coating either separately or in the form of a composition prepared in advance for such purpose. The following are representative examples of compositions suitable for use in the preparation of nitumescent flame-retardant coatings in accordance with this invention:

EXAMPLE 8

| Ingredient: | Parts by weight |
| --- | --- |
| Compound exemplified by Formula (g) | 1 |
| Compound exemplified by Formula (c) | 1 |

EXAMPLE 9

| Ingredient: | Parts by weight |
| --- | --- |
| Compound exemplified by Formula (g) | 5 |
| Compound exemplified by Formula (d) | 1 |

EXAMPLE 10

| Ingredient: | Parts by weight |
| --- | --- |
| Compound exemplified by Formula (h) | 20 |
| Compound exemplified by Formula (e) | 1 |

EXAMPLE 11

| Ingredient: | Parts by weight |
| --- | --- |
| Compound exemplified by Formula (k) | 10 |
| Compound exemplified by Formula (f) | 1 |

EXAMPLE 12

| Ingredient: | Parts by weight |
| --- | --- |
| Compound exemplified by Formula (i) | 15 |
| Compound exemplified by Formula (c) | 1 |

EXAMPLE 13

| Ingredient: | Parts by weight |
| --- | --- |
| Compound exemplified by Formula (j) | 18 |
| Tributyl phosphite | 1 |

EXAMPLE 14

| Ingredient: | Parts by weight |
| --- | --- |
| Compound exemplified by Formula (g) | 4 |
| Diethyl phosphite | 1 |

EXAMPLE 15

| Ingredient: | Parts by weight |
| --- | --- |
| Compound exemplified by Formula (g) | 8 |
| Dimethyl methyl phosphonate | 1 |

EXAMPLE 16

| Ingredient: | Parts by weight |
| --- | --- |
| Compound exemplified by Formula (h) | 12 |
| n-Butyl acid phosphate | 1 |

EXAMPLE 17

| Ingredient: | Parts by weight |
| --- | --- |
| Compound exemplified by Formula (j) | 2 |
| Triallyl phosphate | 1 |

EXAMPLE 18

Intumescent nitrocellulose lacquer formulation

| Nitrocellulose RS ½ sec. (30% butanol) | 19.0 |
| --- | --- |
| Wood resin (Vinsol, Hercules, Inc.) | 6.7 |
| Phosphorus-containing derivative of Example 2 | 12.3 |
| Phenylbiguanidine hydrochloride of Example 3 | 18.3 |
| Colloidal silica (Cabosil M-5) | 0.5 |
| Acetone | 3.4 |
| Toluene | 20.4 |
| Cellosolve acetate | 19.5 |

The nitrocellulose, wetted with 30% butanol, is placed in a solution vessel and the diluent (toluene) is added in the quantity specified. Thereafter, solvents acetone and Cellosolve acetate are added. The mixture is stirred until the nitrocellulose solution is clear and then the wood resin and colloidal silica are added with stirring to achieve a homogeneous solution and mixture. Then are added flame-retardant additives of Examples 2 and 3 in the quantities specified.

EXAMPLE 19

Intumescent polyurethane coating

A urethane propolymer is prepared as in Example 4. A varnish is then prepared by dissolving 17.3 grams of the urethane prepolymer in 17.5 grams of Cellosolve acetate, 8.75 grams of methyl ethyl ketone and 8.75 grams of toluene with slow stirring. When the prepolymer solution has become clear 17.5 grams of the phenylbiguanidine hydrochloride of Example 3 and 43.4 grams of the phosphorus-containing allyl chlorendate derivative of Example 2 are stirred into the solution with slow mixing. The resulting varnish may be used wherever an intumescent flame-retardant coating may be desired.

EXAMPLE 20

Intumescent polyvinyl acetate emulsion based coating formulation

| Ingredient: | Percent by weight |
| --- | --- |
| Polyvinyl acetate emulsion | 48.0 |
| Flame-retardant derivative of Example 2 | 13.0 |
| Flame-retardant derivative of Example 3 | 26.0 |
| Water | 13.0 |

A polyvinyl acetate emulsion is prepared from the following materials in the following manner:

| Ingredient: | Percent by weight |
| --- | --- |
| Water | 43.11 |
| Dodecyl benzene sulfonate | 0.11 |
| Polyoxyethylene (20) nonyl phenol | 1.32 |
| Borax | 0.25 |
| Potassium persulfate | 0.21 |
| Vinyl acetate | 55.0 |

Dodecyl benzene sulfonate and polyoxyethylene (20) nonyl phenol are added to the water in the quantities indicated. Catalyst potassium persulfate is then added and the solution warmed to about 80° C. While maintaining the temperature at about 80° C. the vinyl acetate monomer is slowly added incrementally. The vinyl monomer polymerizes. The temperature is maintained at about 80° C. until free monomer content is below about 0.5%. To the polymerized mixture is added the remaining 13.0 grams of water and the additives of Examples 2 and 3 in the quantities indicated.

EXAMPLE 21

Flame-retardant intumescent polyester formulation

| Ingredient: | Percent by weight |
| --- | --- |
| Polyester resin (Atlac 382) | 40 |
| Styrene | 40 |
| Halogenated hydrocarbon (tetrachlorodiphenyl ether) | 20 |
| Allyl chlorendate derivative of Example 2 | 5 |
| Methyl ethyl ketone peroxide solution | 1 |
| Cobalt naphthenate | 1 |

The polyester resin of the above formulation is an unsaturated polyester resin prepared in the conventional manner by reacting 1 mole of polyoxypropylene (2) bisphenol A with 1 mole of fumaric acid. 40 grams of the polyester resin has dissolved, 20 grams of halogenated hydrocarbon are added and the mixture stirred until homogeneous. Thereafter, 5 grams of the flame-retardant additive of Example 2 are added together with catalysts. The catalysts are mixed in by hand. After catalyzation, the polyester solution is poured into glass molds and cured at room temperature. The following are results of ASTM D-635 flame tests performed on ⅛ inch castings: ¼ inch in 48 sec.; 3.4 inch in 3 min.

Having thus described my invention, I claim:

1. A compound represented by formula:

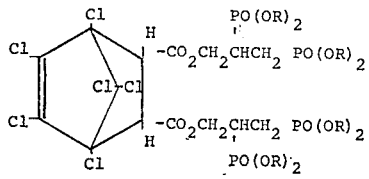

wherein R is selected from the group consisting of alkyl radicals containing from 1 to 4 carbon atoms, alkenyl radicals containing from 2 to 4 carbon atoms, alkenyl radicals containing from 2 to 4 carbon atoms substituted with 2 halogen atoms selected from the group consisting of bromine and chlorine, a phenyl group and a halogen substituted phenyl group wherein the halogen is selected from the group consisting of chlorine and bromine.

2. A compound according to claim 1 having the formula:

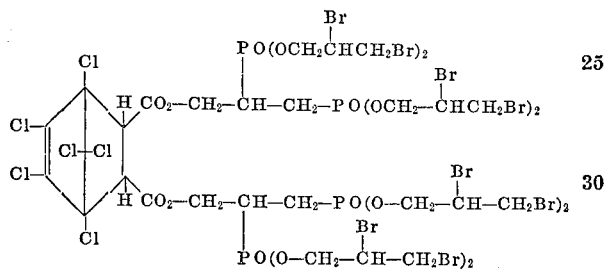

3. A compound according to claim 1 having the formula:

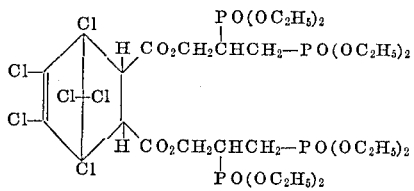

References Cited

UNITED STATES PATENTS 2,634,288  4/1953  Boyer et al. _____ 260—932
2,719,167  9/1955  Schmidt _____ 260—932

CHARLES B. PARKER, Primary Examiner

A. H. SUTTO, Assistant Examiner

U.S. Cl. X.R.

260—2.5 AJ, 29.6 B, 45.85, 45.9 R, 468 B, 555, 970; 106—15 FP